(12) United States Patent
Shigemura (10) Patent No.: US 9,008,454 B2
(45) Date of Patent: Apr. 14, 2015

(54) IMAGE PROCESSING APPARATUS, IMAGE PROCESSING METHOD, AND TANGIBLE COMPUTER READABLE MEDIUM FOR PROCESSING IMAGE

(71) Applicant: DENSO CORPORATION, Kariya, Aichi-pref. (JP)

(72) Inventor: Shusaku Shigemura, Kariya (JP)

(73) Assignee: DENSO CORPORATION, Kariya (JP)

( * ) Notice: Subject to any disclaimer, the term of this patent is extended or adjusted under 35 U.S.C. 154(b) by 218 days.

(21) Appl. No.: 13/738,000

(22) Filed: Jan. 10, 2013

(65) Prior Publication Data

US 2013/0177255 A1    Jul. 11, 2013

(30) Foreign Application Priority Data

Jan. 11, 2012   (JP) .................................... 2012-3250

(51) Int. Cl.
*G06K 9/40*     (2006.01)
*G06T 5/00*     (2006.01)
*G06T 5/20*     (2006.01)

(52) U.S. Cl.
CPC . *G06T 5/002* (2013.01); *G06T 5/20* (2013.01); *G06T 2207/20192* (2013.01)

(58) Field of Classification Search
CPC . G06K 9/00516; G06K 9/40; H04N 5/23212; G06T 3/4015; G06T 5/002; G06T 5/10; G06T 5/20; G06T 11/006; G06T 2207/10024; G06T 2207/20064; G06T 2207/20084; G06T 2207/20192; G06T 2211/421; G03B 13/36
See application file for complete search history.

(56) References Cited

U.S. PATENT DOCUMENTS

| | | | |
|---|---|---|---|
| 6,741,730 B2* | 5/2004 | Rahn et al. | 382/131 |
| 7,190,832 B2* | 3/2007 | Frost et al. | 382/173 |
| 7,221,805 B1* | 5/2007 | Bachelder | 382/255 |
| 8,559,744 B2* | 10/2013 | Cao et al. | 382/260 |
| 2003/0152287 A1 | 8/2003 | Nakajima et al. | |
| 2005/0123214 A1 | 6/2005 | Takahira | |
| 2008/0284878 A1 | 11/2008 | Kosakai et al. | |
| 2009/0324066 A1 | 12/2009 | Saito et al. | |
| 2010/0066868 A1 | 3/2010 | Shohara | |
| 2010/0067572 A1 | 3/2010 | Mori | |
| 2011/0001992 A1 | 1/2011 | Kajihara et al. | |

OTHER PUBLICATIONS

Office Action mailed Nov. 26, 2013 in the corresponding JP application No. 2012-003250 (with English Translation).

* cited by examiner

*Primary Examiner* — Jose Couso
(74) *Attorney, Agent, or Firm* — Posz Law Group, PLC

(57) ABSTRACT

An image processing apparatus includes: an image obtaining device; an image dividing device that divides the image through a fine structure retrieving filter and a basic structure retrieving filter into a detail signal component and a basic signal component, the detail signal component including an edge component, a texture component, and a noise component, and the basic signal component being other than the detail signal component; an image correcting device that retrieves a focused picture cell, determines whether the focused picture cell represents the noise, corrects the detail signal component to reduce the noise component in the focused picture cell when the focused picture cell represents the noise; and an image synthesizing device that synthesizes a basic structure image provided by the basic signal component and a corrected fine structure image provided by the corrected detail signal component.

19 Claims, 6 Drawing Sheets

OBJECT IMAGE (m, n)
FOCUS IMAGE (i, j)

| 29 | 23 | 28 | 21 | 27 |
|----|----|----|----|----|
| 20 | 26 | 22 | 24 | 28 |
| 23 | 21 | 70 | 20 | 22 |
| 25 | 23 | 22 | 26 | 21 |
| 30 | 25 | 29 | 27 | 24 |

FIG. 5B

BRIGHT GRAD VECTOR

FIG. 5C

OBJECT IMAGE (m, n)
FOCUS IMAGE (i, j)

| 79 | 73 | 78 | 71 | 77 |
|----|----|----|----|----|
| 70 | 76 | 72 | 74 | 78 |
| 73 | 71 | 20 | 70 | 72 |
| 75 | 73 | 72 | 76 | 71 |
| 70 | 75 | 79 | 77 | 74 |

FIG. 5D

BRIGHT GRAD VECTOR

IMAGE PROCESSING APPARATUS, IMAGE PROCESSING METHOD, AND TANGIBLE COMPUTER READABLE MEDIUM FOR PROCESSING IMAGE

CROSS REFERENCE TO RELATED APPLICATION

This application is based on Japanese Patent Application No 2012-3250 filed on Jan. 11, 2012, the disclosure of which is incorporated herein by reference.

TECHNICAL FIELD

The present disclosure relates to an image processing apparatus an image processing method and a tangible computer readable medium for processing an image.

BACKGROUND

Conventionally, a method for applying a mean filter or a median filter to a whole of an image is well known as a noise reduction method for reducing a noise, which is overlapped on the image obtained by projecting a real space to a plane having multiple picture cells.

When the mean filter is applied to the image, a Gaussian noise is reduced. When the median filter is applied to the image, an impulse noise is reduced. However, when these methods are applied to the image, a whole of the image is averaged. Thus, an edge component in the image may be blurred. Specifically, when the mean filter or the median filter is applied to the image, a high frequency component showing a fine structure of an object projected to the image may not remain.

In order to preserve the high frequency component, a method with using a $\epsilon$-filter is proposed. The $\epsilon$-filter is prepared by modifying the mean filter. In order to preserve the high frequency component, a method for synthesizing a corrected image filtered through the mean filter and an original image with a ratio corresponding to an edge characteristic value indicative of the degree of the edge is proposed. These methods are described in, for example, JP-A-2010-92461 corresponding to US 2010/0066868.

The $\epsilon$-filter preserves a picture cell value of each picture cell in a masking area when the difference of the picture cell value between the picture cell and the focused picture cell is small. The $\epsilon$-filter replaces a picture cell value of each picture cell with the picture cell value of the focused picture cell when the difference of the picture cell value between the picture cell and the focused picture cell is large. Then, the image is averaged with using the picture cell value of each picture cell, i.e., the image is averaged with using only the picture cell value of the picture cell having the picture cell value smaller than the focused picture cell. Thus, when the noise of the mage is reduced with using the $\epsilon$-filter, the noise is not reduced when the picture cell value of the picture cell providing the edge is not larger than the picture cell value of the noise component. Further, the $\epsilon$-filter does not reduce the impulse noise.

In the noise reduction method described in JP-A-2010-92461, firstly, the median filter filters the image, on which a noise is overlapped, so that pre noise-reduction image is generated. Then, the edge characteristic value of the pre noise-reduction image is retrieved from a ratio between a dispersion value of a signal level in arrange including the focused picture cell and the dispersion value of the signal level of a whole of the pre noise-reduction image.

However, in the noise reduction method in JP-A-2010-92461, since the pre noise-reduction image is obtained with using the median filter, the edge characteristic value is not calculated with high accuracy. Thus, the fine structure of the object projected as the image is not clear.

Thus, the above methods do not provide the sufficient reduction of the noise, which overlaps on the image.

In order to reduce the noise sufficiently, another method for reducing the noise is proposed in JP-A-2008-172431 corresponding to US 2009/0324066. In the method, an image signal for providing the image is divided into a first signal component and a second signal component. A noise reduction parameter, which is necessary for the noise reduction process, is prepared according to the signal level of the first signal component. Then, the noise in the second signal component is reduced. Here, the first signal component represents a framework component of the object, which is projected to the image. The first signal component includes the edge component. Further, the second signal component represents a residual error of the first signal component with respect to the image signal.

In the method described in JP-A-2008-172431, a parameter is necessary when the image signal is divided into the first and second signal components. The parameter is referred as a dividing parameter. The dividing parameter is introduced by solving a formulated energy functional with a Projection method. Here, the energy functional is formulated by minimizing the energy functional as a variational problem.

In the above method in JP-A-2008-172431, although the noise overlapping the image is reduced, a throughput for determining an optimum value of the dividing parameter is large.

SUMMARY

It is an object of the present disclosure to provide an image processing apparatus, an image processing method and a tangible computer readable medium for processing an image. The noise overlapping the image is sufficiently reduced and the throughput for performing the noise reduction process is reduced.

According to a first aspect of the present disclosure, an image processing apparatus includes: an image obtaining device that obtains an image by projecting an object in actual space to a plane including a plurality of picture cells; an image dividing device that filters the image through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component; an image correcting device that retrieves one of the picture cells in a fine structure image, which is provided by the detail signal component, as a focused picture cell, determines whether the focused picture cell represents the noise, corrects the detail signal component so as to reduce the noise component in the focused picture cell when the focused picture cell represents the noise so that a corrected detail signal component is generated; and an image synthesizing device that synthesizes a basic structure image, which is provided by the basic signal component, and a corrected fine structure image, which is provided by the corrected detail signal component, so that a modified image is generated.

In the apparatus, the noise overlapping the image is sufficiently reduced, and the throughput for performing the noise reduction process is reduced.

According to a second aspect of the present disclosure, a method for processing an image includes: obtaining an image by projecting an object in actual space to a plane including a plurality of picture cells; filtering the image through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component; retrieving one of the picture cells in a fine structure image, which is provided by the detail signal component, as a focused picture cell, determining whether the focused picture cell represents the noise, and correcting the detail signal component so as to reduce the noise component in the focused picture cell when the focused picture cell represents the noise so that a corrected detail signal component is generated; and synthesizing a basic structure image, which is provided by the basic signal component, and a corrected fine structure image, which is provided by the corrected detail signal component, so that a modified image is generated.

In the above method, the noise overlapping the image is sufficiently reduced and the throughput for performing the noise reduction process is reduced.

According to a third aspect of the present disclosure, a tangible computer readable medium includes instructions being executed by a computer, the instructions including a computer-implemented method for processing an image. The instructions includes: obtaining an image by projecting an object in actual space to a plane including a plurality of picture cells; filtering the image through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component; retrieving one of the picture cells in a fine structure image, which is provided by the detail signal component, as a focused picture cell, determining whether the focused picture cell represents the noise, and correcting the detail signal component so as to reduce the noise component in the focused picture cell when the focused picture cell represents the noise so that a corrected detail signal component is generated; and synthesizing a basic structure image, which is provided by the basic signal component, and a corrected fine structure image, which is provided by the corrected detail signal component, so that a modified image is generated.

In the above medium, the noise overlapping the image is sufficiently reduced, and the throughput for performing the noise reduction process is reduced.

According to a fourth aspect of the present disclosure, an image processing apparatus includes: a camera that shoots an image; an image dividing device that divides the image through a fine structure retrieving filter and a basic structure retrieving filter into a fine structure image provided by a detail signal component and a basic structure image provided by a basic signal component, wherein the fine structure retrieving filter retrieves the detail signal component from the image, the detail signal component including an edge component, a texture component, and a noise component, wherein the basic structure retrieving filter retrieves the basic signal component from the image, the basic signal component being a frequency component other than the detail signal component; an image correcting device that retrieves one of picture cells in the fine structure image as a focused picture cell, determines whether the focused picture cell represents a noise, corrects the detail signal component so as to reduce the noise component in the focused picture cell when the focused picture cell represents the noise so that a corrected detail signal component is generated; and an image synthesizing device that synthesizes the basic structure image, and a corrected fine structure image, which is provided by the corrected detail signal component, so that a modified image is generated.

In the above apparatus, the noise overlapping the image is sufficiently reduced and the throughput for performing the noise reduction process is reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)
[Image Processing System]

Figure 1:
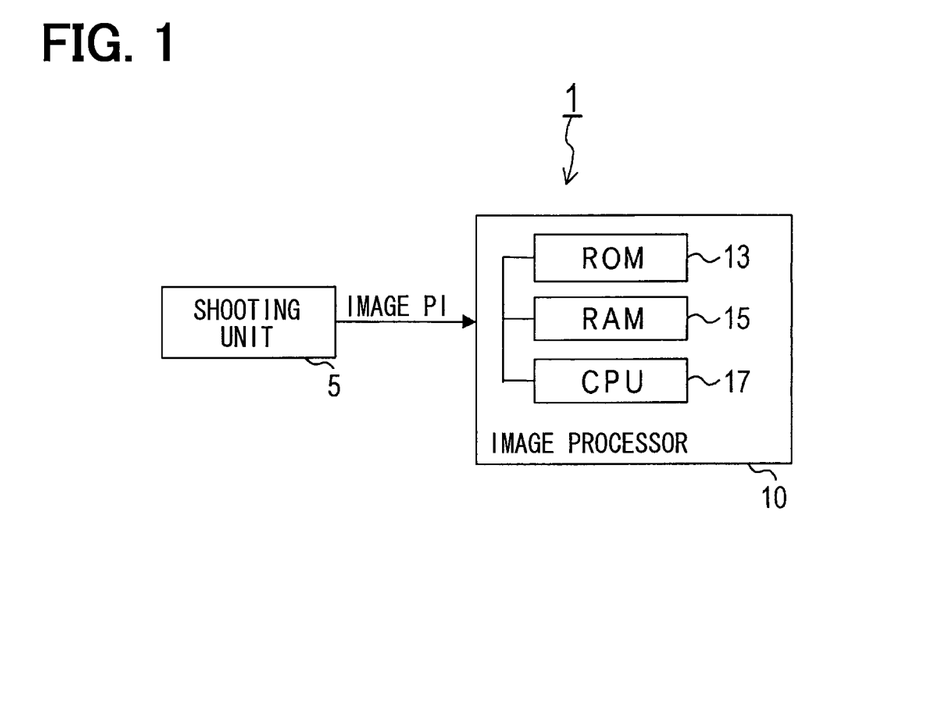
FIG. 1 is a block diagram showing an image processing system.

As shown in FIG. 1, an image processing system 1 includes a shooting unit 5 for shooting an image PI, and an image processing apparatus 10 for executing the image processing with respect to the image PI, which is shot by the shooting unit 5.

The shooting unit 5 is a conventional shooting device for shooting an image PI with a shooting element, the image PI obtained by projecting actual space on a plane having multiple picture cells. The conventional shooting device is a camera including the shooting element such as a CCD or a CMOS element, an optical lens, an optical filter, and a periphery circuit such as a power source. The shooting unit 5 shoots the image PI in a shooting range, which represents predetermined actual space.

The image processing system 1 according to the present embodiment is, for example, mounted on a vehicle. Specifically, the system 1 may execute prior processing of an image, which is to be utilized by a driver monitoring system for monitoring a driver based on the image of the driven. Here, the monitoring of the driver monitoring system provides to estimate consciousness degree of the driver and to monitor whether the estimated consciousness is equal to or smaller than a predetermined value. Alternatively, the monitoring of the system may provide to estimate a direction of a visual line of the driver and to determine whether the driver looks at the road. The driver monitoring system may output a warning when the system determines that the estimated consciousness is equal to or smaller than the predetermined value or the driver does not look at the road.

The image processing system 1 according to the present embodiment may be mounted on the vehicle, and execute prior processing of an image, which is to be utilized by a periphery monitoring system for controlling an in-vehicle apparatus according to a situation around the vehicle. The situation around the vehicle is recognized by the system according to the result of the image around the vehicle. Here, the periphery monitoring system may be a pre-crash safety system for winding a seat belt when the system determines based on the situation around the vehicle that it is impossible to avoid collision between the vehicle and an object such as a forward vehicle. The system recognizes the situation around the vehicle such as a positioning relationship between the forward vehicle and the vehicle. Alternatively, the periphery monitoring system may be an adaptive cruise control system for controlling a power train system and/or a brake system so as to follow the forward vehicle, and the system may recognize the situation around the vehicle such as a positioning relationship between the forward vehicle and the vehicle. Here, the periphery monitoring system may be an antitheft security system, which recognizes the situation around the vehicle such as situation of a person existing around the vehicle, and protects the vehicle from being stolen by the thief when the system determines that the person around the vehicle exhibits suspicious behavior.

[Construction of Image Processing Apparatus]

The image processing apparatus 10 is a conventional micro computer including: a ROM 13 for storing data and a program, which are necessary to keep storing contents of information even when a power source turns off; a RAM 15 for storing data temporally; and a CPU 17 for executing various processes according to the program stored in the RAM 15.

The ROM 13 stores a reduction process program, which provides a noise reduction process as one of image processing techniques. In the noise reduction process, the noise overlapping the image PI shot by the shooting unit 5 is reduced.

Figure 2:
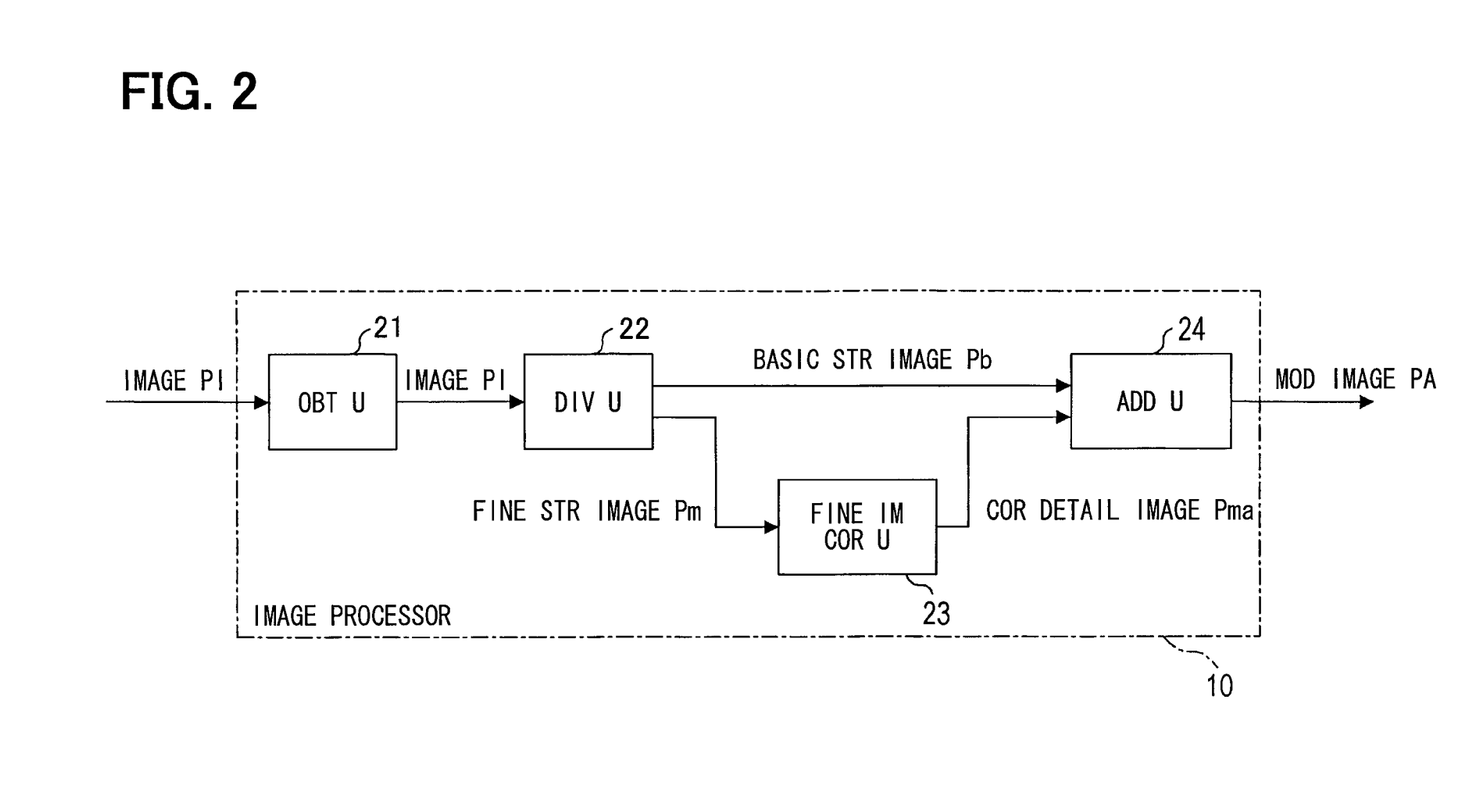
FIG. 2 is a block diagram showing an image processing apparatus.

Here, FIG. 2 shows a functional block diagram of the image processing apparatus 10. The function of the apparatus 10 is realized by executing the reduction processing program with the apparatus 10.

Specifically, the apparatus 10 includes an obtaining unit 21 for obtaining the image PI shot by the shooting unit 5, and a dividing unit 22 for diving the image PI obtained by the obtaining unit 21 into the fine structure image Pm and the basic structure image Pb. Further, the unit 22 retrieves the fine structure image Pm and the basic structure image Pb.

Here, the fine structure image Pm is an image including multiple fine structure picture cells. The fine structure picture cells are spatial-frequency components of the image PI, which represent details of an object projected to the image PI. Here, the spatial-frequency component is referred as a detail signal component. Here, the spatial-frequency component representing the detail of the object includes an edge component indicative of an end of the object projected to the image PI, a texture component indicative of design and texture of the object, and the noise component overlapping the image PI.

The basic structure image Pb is an image including multiple basic structure picture cells. The basic structure picture cells are spatial-frequency components of the image PI other than the detail signal components. The basic structure picture cell provides a whole structure of the object, which is projected to the image PI. The basic structure picture cell includes a basic signal component.

The apparatus 10 further includes a fine image correction unit 23 and an adding unit 24. The fine image correction unit 23 generates a corrected detail image Pma by correcting the fine structure image Pm so as to reduce the noise in the fine structure image Pm, which is retrieved by the dividing unit 22. The adding unit 24 synthesizes the basic structure image Pb retrieved by the dividing unit 22 and the corrected generated by the detail image so that the unit 24 generates a modification image PA.

Here, the corrected detail image Pma is an image including multiple corrected fine structure picture cells. The corrected fine structure picture cell is prepared by correcting the fine structure picture cell so as to reduce the noise component. The corrected fine structure picture cell includes the spatial-frequency component indicative of the detail of the object, which is projected to the image PI, and the noise component of which is reduced. The corrected fine structure picture cell includes the corrected detail signal component.

Figure 3:
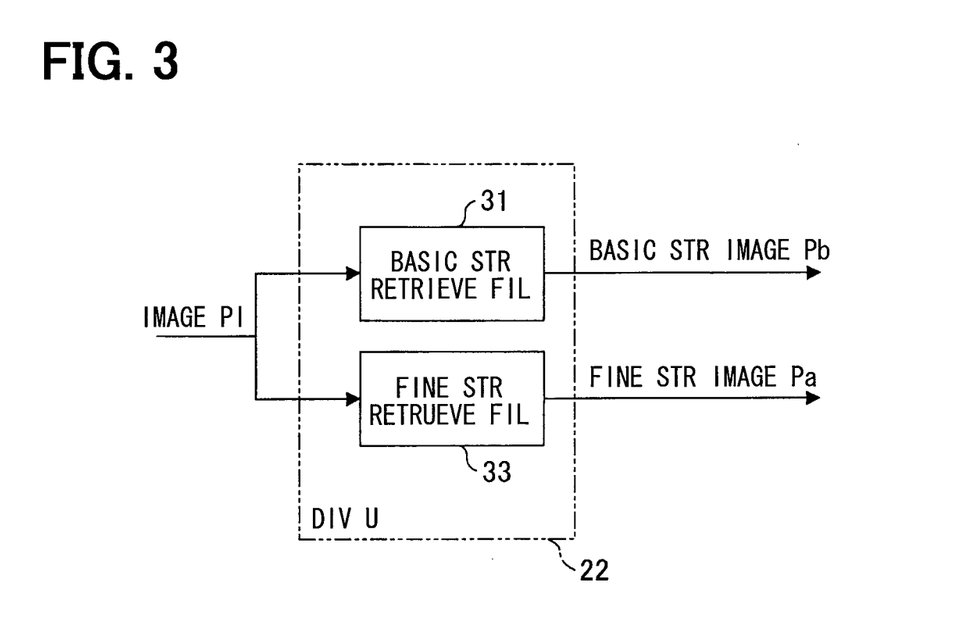
FIG. 3 is a block diagram showing a dividing unit according to a first embodiment.

Specifically, as shown in FIG. 3, the dividing unit 22 includes a basic structure retrieving filter 31 for retrieving a low frequency component of the spatial-frequency component in the image PI and a fine structure retrieving filter 33 for retrieving a high frequency component of the spatial-frequency component in the image PI.

In the present embodiment, the low frequency component of the image PI is retrieved as the basic structure image Pb, and the high frequency component of the image PI is retrieved as the fine structure image Pm.

In the present embodiment, the image PI obtained by the obtaining unit 21 is input into each of the basic structure retrieving filter 31 and the fine structure retrieving filter 33. Thus, in the dividing unit 22 according to the present embodiment, the basic structure retrieving filter 31 and the fine structure retrieving filter 33 independently function.

The basic structure retrieving filter 31 according to the present embodiment functions as a low pass filter for passing a frequency component of the spatial-frequency component of the image PI having the frequency equal to or smaller than an upper limit frequency. The basic structure picture cell always includes the frequency component having the frequency equal to or smaller than the upper limit frequency component. The upper limit frequency may be preliminary determined in experiments with using various types of images as the image PI, which are supposed to be obtained by the apparatus 10. Thus, the basic structure retrieving filter 31 provides the low pass filter since the special-frequency component indicative of the whole structure of the object is the low frequency component of the image PI.

The fine structure retrieving filter 33 according to the present embodiment functions as a high pass filter for passing a frequency component of the spatial-frequency component of the image PI having the frequency equal to or higher than a lower limit frequency. The fine structure picture cell always includes the frequency component having the frequency equal to or higher than the lower limit frequency component. The lower limit frequency may be preliminary determined in experiments with using various types of images as the image PI, which are supposed to be obtained by the apparatus 10. Thus, the fine structure retrieving filter 33 provides the high pass filter since the special-frequency component indicative of the fine structure of the object is the high frequency component of the image PI.

[Noise Reduction Process]

Figure 4:
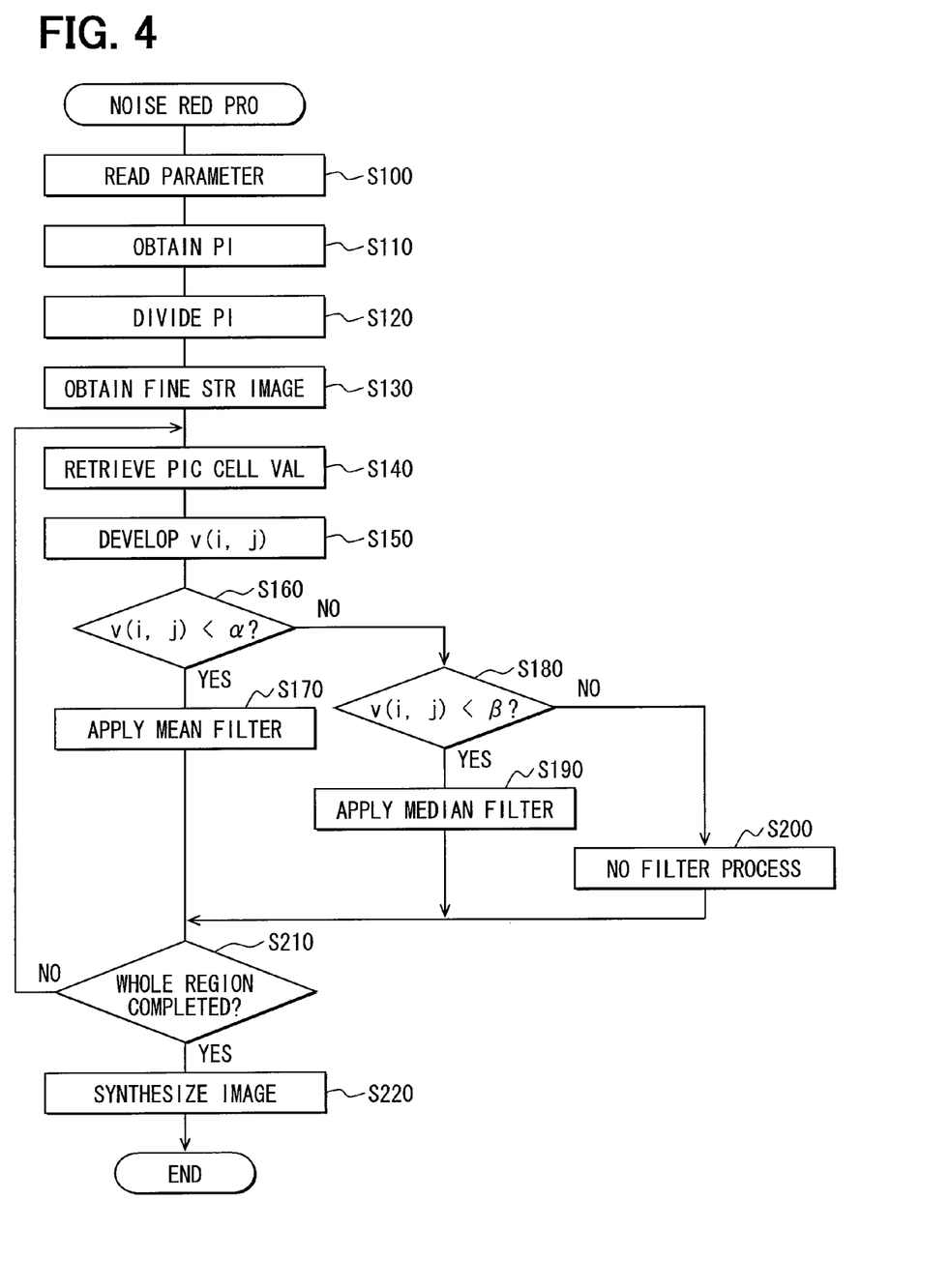
FIG. 4 is a flowchart showing a noise reduction process.

The noise reduction process executed by the image processing apparatus 10 will be explained as follows.

The apparatus 10 starts to execute the noise reduction process when the image processing system 1 is activated. Specifically, when the ignition switch turns on, the apparatus 10 starts to activate the noise reduction process. After that, the apparatus 10 repeats to execute the noise reduction process at every frame.

In the noise reduction process, as shown in FIG. 4, when the process is activated, in step S100, parameters such as a predetermined standard threshold α and another predetermined standard threshold β, which are used for dividing the image PI and provide the upper limit frequency and the lower limit frequency, are read out. In step S110, the apparatus 10 obtains the image PI shot by the shooting unit 5. Then, the obtained image PI is input into each of the basic structure retrieving filter 31 and the fine structure retrieving filter 33, so that the image PI is divided into the fine structure image Pm and the basic structure image Pb. Thus, the fine structure image Pm and the basic structure image Pb are retrieved in step S120. Then, the apparatus 10 obtains the retrieved fine structure image Pm.

One of all fine structure picture cells in the fine structure image Pm is defined as a focused picture cell (i, j). A mask region as a standard range is determined around the focused picture cell (i, j) as a center. For example, the mask region is a 5×5 region or a 7×7 region with the center of the focused picture cell (i, j). Then, in step S140, a picture cell value of each fine structure picture cells in the mask region is retrieved. Further, in step S150, a vector concentration degree v(i, j) of the focused picture cell (i, j) is developed.

Specifically, the vector concentration degree v(i, j) is developed with using the following equations F(1) and F(2). Here, the picture cell value of the focused picture cell (i, j) is defined as d(i, j). The picture cells other than the focused picture cell (i, j) in the mask region are defined as object picture cells (m, n). The picture cell value of the object picture cells (m, n) is defined as d(m, n).

$$v(i, j) = \frac{1}{M^2 - 1} \left| \sum_{m=-M/2}^{M/2} \sum_{n=-M/2}^{M/2} \text{index}(m, n) \right| \quad (1)$$

$$\text{index}(m, n) = \begin{cases} 1 & d(i, j) - d(m, n) > 0 \\ 0 & d(i, j) - d(m, n) = 0 \\ -1 & d(i, j) - d(m, n) < 0 \end{cases} \quad (2)$$

Here, in the equation F(1), the numeral M represents the dimensions of the mask region, i.e., the mask size of the standard range. As shown in the equation F(2), the numeral index(m, n) represents a direction of the brightness gradient vector, which is developed in one object picture cell (m, n). The direction index(m, n) is a positive standard value when the picture cell value d(i, j) of the focused picture cell (i, j) is larger than the picture cell value d(m, n) of the direction index(m, n). In the present embodiment, the positive standard value is plus one. The direction index(m, n) is a negative standard value when the picture cell value d(i, j) of the focused picture cell (i, j) is smaller than the picture cell value d(m, n) of the direction index(m, n). In the present embodiment, the positive standard is minus one. The direction index (m, n) is zero when the picture cell value d(i, j) of the focused picture cell (i, j) is equal to the picture cell value d(m, n) of the direction index(m, n).

Specifically, the brightness gradient vector is set to be one of "−1," "0," and "+1" according to a fact whether the brightness gradient vector turns to the focused picture cell. Here, the fact is determined as a result of comparison between the focused picture cell and the periphery picture cells. Thus, the brightness gradient vector is set according to the mathematical rule such that the brightness gradient vector turns to a direction from the picture cell having a small picture cell value to the picture cell having a large picture cell value.

Thus, the vector concentration degree v(i, j) is calculated such that the direction of the brightness gradient vector is indicated by the difference between the picture cell value d(m, n) of each object picture cell (m, n) and the picture cell value d(i, j) of the focused picture cell (i, j), all of the directions of the brightness gradient vectors (i.e., index(m, n)) are tallied, and the gathered directions are normalized (i.e., averaged) with using the dimensions of the standard range (i.e., the number of object picture cells).

Here, as shown in the equation F(1), the vector concentration degree v(i, j) in the present embodiment is in a range between zero and one.

Then, in the noise reduction process, as described above, the apparatus 10 determines in step S160 whether the vector concentration degree v(i, j) developed in step S150 is smaller than a predetermined standard threshold α.

Here, the predetermined standard threshold α represents the certain value of the vector concentration degree v indicative of the edge or the texture other than the noise. The standard threshold α may be preliminary determined in experiments with using various types of images as the image PI, which are supposed to be obtained by the apparatus 10.

As a result of the determination in step S160, when the vector concentration degree v(i, j) is smaller than the predetermined standard threshold α, i.e., when the determination in step S160 is "YES," it goes to step S170. In step S170, since the focused picture cell (i, j) corresponding to the vector concentration degree v(i, j) is not the noise, the focused picture cell (i, j) corresponding to the vector concentration degree v(i, j) is filtered by a predetermined mean filter with using the mask region as the standard range. Thus, in step S170, the fine structure picture cell as the focused picture cell (i, j), which is not determined as the noise, is filtered with the mean filter, and then, the filtered fine structure picture cell is set as the corrected fine picture cell.

Then, it goes to step S210.

On the other hand, as a result of the determination in step S160, when the vector concentration degree v(i, j) is equal to or larger than the predetermined standard threshold α, i.e., when the determination in step S160 is "NO," it goes to step S180. In step S180, the apparatus 10 determines whether the vector concentration degree v(i, j) developed in step S150 is equal to or larger than another predetermined standard threshold β.

Figure 5A:
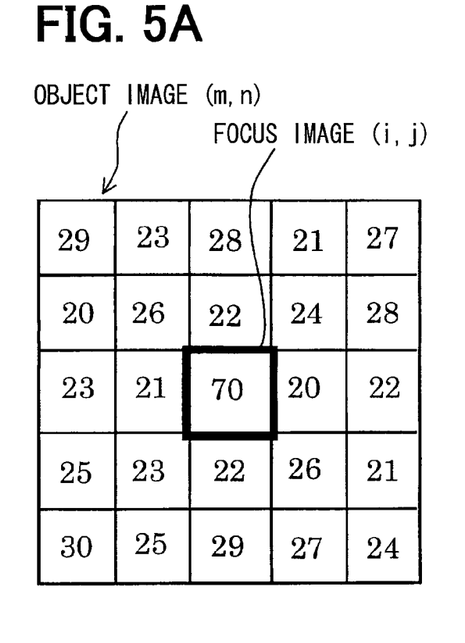
FIGS. 5A to 5D are diagrams showing brightness gradient vectors.
Figure 5B:
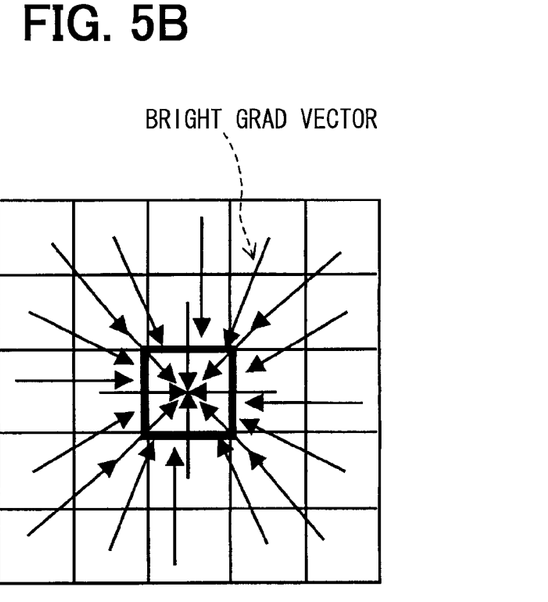
Figure 5C:
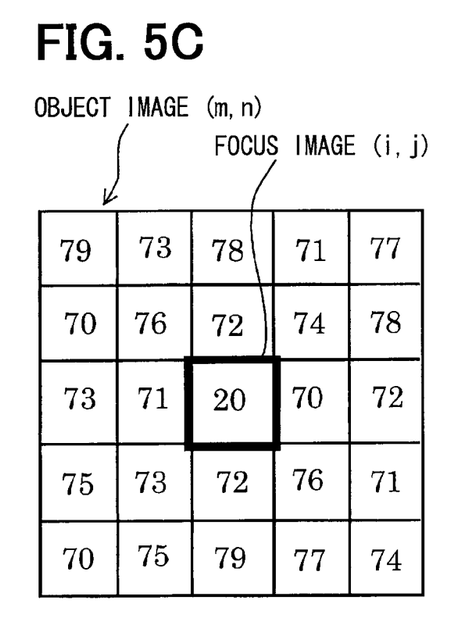
Figure 5D:
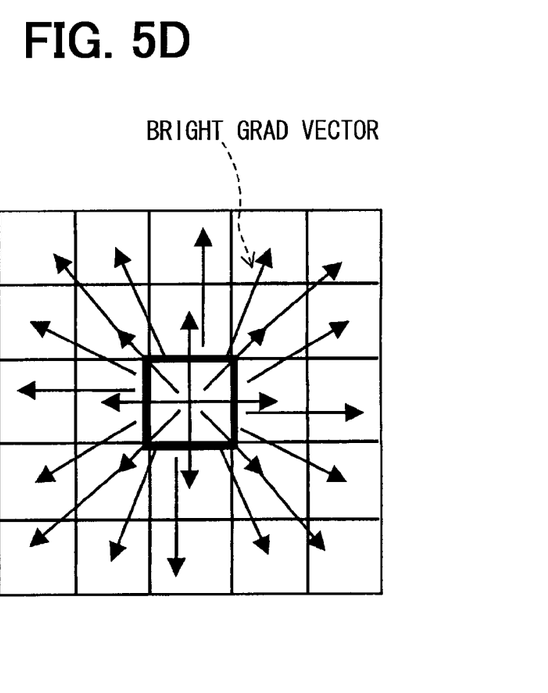

Here, FIG. 5A shows the picture cell value of each picture cell in a certain standard range. The numerals in FIG. 5A represent the picture cell values. FIG. 5B shows the brightness gradient vector of each object picture cell in FIG. 5A. FIG. 5C shows the picture cell value of each picture cell in another certain standard range. The numerals in FIG. 5C represent the picture cell values. FIG. 5D shows the brightness gradient vector of each object picture cell in FIG. 5C.

In FIGS. 5A and 5B, the picture cell value d(i, j) of the focused picture cell (i, j) in the standard range is larger than the picture cell value d(m, n) of the object picture cell (m, n) in the standard range. In this case, the brightness gradient vector of each object picture cell (m, n) in the standard range turns to the direction from each object picture cell (m, n) to the focused picture cell (i, j). Accordingly, the total of the directions of the brightness gradient vectors has the large absolute value. Further, the vector concentration degree v(i, j) is close to one (i.e., the standard value of "1").

In FIGS. 5C and 5D, the picture cell value d(i, j) of the focused picture cell (i, j) in the standard range is smaller than the picture cell value d(m, n) of the object picture cell (m, n) in the standard range. In this case, the brightness gradient vector of each object picture cell (m, n) in the standard range turns to the direction from the focused picture cell (i, j) to each object picture cell (m, n). Accordingly, the total of the directions of the brightness gradient vectors has the large absolute value. Further, the vector concentration degree v(i, j) is close to one (i.e., the standard value of "1").

As described above, when the possibility that the focused picture cell (i, j) is the noise is high, correlation between the picture cell value d(i, j) of the focused picture cell (i, j) and the picture cell value d(m, n) of the object picture cell (m, n) is low, and therefore, the vector concentration degree v(i, j) is close to the standard value of "1."

Thus, the predetermined standard threshold $\beta$ in the present embodiment represents the certain value of the vector concentration degree v indicative of the noise. Here, the standard threshold $\beta$ is larger than the standard threshold $\alpha$. Although the standard threshold $\beta$ is smaller than the standard value of "1," the standard threshold p is preliminary set to be close to the standard value of "1." The standard threshold $\beta$ may be preliminary determined in experiments with using various types of images as the image PI, which are supposed to be obtained by the apparatus 10.

In the noise reduction process, as a result of the determination in step S180, when the vector concentration degree v(i, j) is equal to or larger than the standard threshold $\beta$, i.e., when the determination in step S180 is "YES," the focused picture cell (i, j) corresponding to the vector concentration degree v(i, j) is the noise. Thus, in step S190, the focused picture cell (i, j) corresponding to the vector concentration degree v(i, j) is filtered by a predetermined median filter with using the mask region as the standard range. Thus, in step S190, the fine structure picture cell as the focused picture cell (i, j), which is determined as the noise, is filtered with the median filter, and then, the corrected fine picture cell is generated.

After that, it goes to step S210.

As a result of the determination in step S180, when the vector concentration degree v(i, j) is smaller than the standard threshold $\beta$, i.e., when the determination in step S180 is "NO," the focused picture cell (i, j) corresponding to the vector concentration degree v(i, j) may be the edge or the texture, and then, it goes to step S210 through step S200.

Specifically, when the vector concentration degree v(i, j) is equal to or larger than the predetermined standard threshold $\alpha$, i.e., when the determination in step S160 is "NO," and when the vector concentration degree v(i, j) is smaller than the standard threshold $\beta$, i.e., when the determination in step S180 is "NO," in step S200, the focused picture cell (i, j) is not filtered, which is different from steps S170 and S190. Then, it goes to step S210. Specifically, in step S200 according to the present embodiment, the fine structure picture cell, i.e., the focused picture cell (i, j) is set to be the corrected fine picture cell.

In step S210, the apparatus 10 determines whether all steps from step S140 to step S210 are performed with respect to all fine structure picture cells corresponding to the fine structure images Pm obtained in step S110, i.e., with respect to each of the fine structure picture cells in a whole region. As a result of the determination in step S210, when all steps from step S140 to step S210 are not performed yet with respect to all fine structure picture cells corresponding to the fine structure images Pm, i.e., when the determination in step S210 is "NO," it goes to step S140. In step S140, another focused picture cell (i+1, j) or (i, j+1), which is prepared by shifting by one picture cell in the X direction or the Y direction, is retrieved, and a new standard range is set around a new focused picture cell (i+1, j) or (i, j+1) as a center of the range. Then, it goes to step S150.

As a result of the determination in step S210, when all steps from step S140 to step S210 are performed with respect to all fine structure picture cells corresponding to the fine structure images Pm, i.e., when the determination in step S210 is "YES," it goes to step S220.

Thus, when all steps from step S140 to step S210 are performed with respect to each of the fine structure images Pm, and the focused picture cell (i, j) is the noise, the focused picture cell (i, j) is corrected so as to reduce the noise component in the focused picture cell (i, j) so that the corrected detail image Pma is generated.

In step S220, the corrected detail image Pma and the basic structure image Pb are synthesized, so that the modified image PA is generated.

Here, the modified image PA in step S220 according to the present embodiment is generated such that each picture cell value of the corrected detail images Pma is multiplied by a synthesis ratio R so that a modified picture cell value is obtained. Then, each modified picture cell value of the corrected detail images Pma is added to the picture cell value of the basic structure image Pb corresponding to the corrected detail images Pma. Thus, the modified image PA is generated.

Here, the synthesis ratio R is calculated based on the equation of "R=P1/P2." The variation P1 is a total of the picture cell values of the fine structure image Pm, and calculated by the following equation F(3). The variation P2 is a total of the picture cell values of the corrected detail images Pma, and calculated by the following equation F(4).

$$P_1 = \Sigma\Sigma [d(x, y)]^2 \quad (3)$$

$$P_2 = \Sigma\Sigma [d(x, y)]^2 \quad (4)$$

Then, the noise reduction process ends.

[Example of Operations in Image Processing Apparatus]

Figure 6:
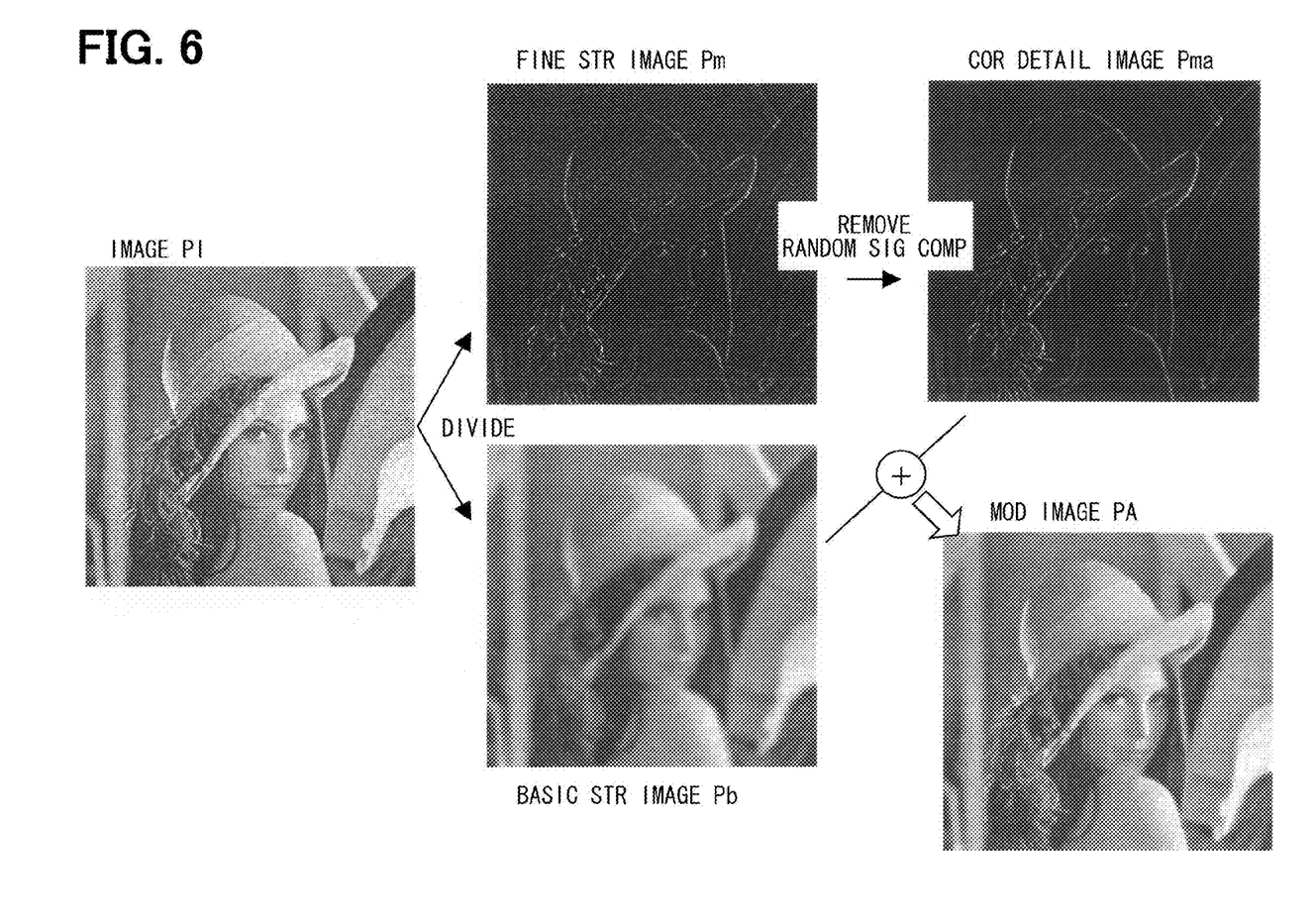
FIG. 6 is a diagram showing images of each step in the image processing executed by the image processing apparatus.

As shown in FIG. 6, the apparatus 10 obtains the image PI shot by the shooting unit 5. Then, the image PI is filtered through the basic structure retrieving filter 31 and the fine structure retrieving filter 33 so that the image PI is divided into the fine structure image Pm and the basic structure image Pb. Thus, the fine structure image Pm and the basic structure image Pb are retrieved.

The vector concentration degree v(i, j) of the focused picture cell (i, j) is developed in each fine structure picture cell of the fine structure image Pm. The apparatus 10 determines whether each focused picture cell (i, j) is the noise. As a result of the determination, when the focused picture cell (i, j) is the noise, the focused picture cell (i, j) is filtered with using the standard range as the mask region so that the noise component is reduced.

Then, the corrected detail image Pma, the noise component of which is reduced, and the basic structure image Pb are synthesized so that the modified image PA is generated.

[Effects of the First Embodiment]

As described above, in the image processing apparatus 10, the corrected detail image Pma and the basic structure image Pb are synthesized so that the modified image PA is generated. Here, a whole of the image in the modified image PA is modified. Thus, the noise component overlapping the modified image PA is reduced, compared with the noise component overlapping the original image PI.

Thus, the apparatus 10 sufficiently reduces the noise in the original image PI.

Further, in the apparatus 10, the fine structure image Pm and the basic structure image Pb are retrieved by applying the image PI through the basic structure retrieving filter 31 and the fine structure retrieving filter 33. Accordingly, in the apparatus 10, the retrieving method of the fine structure image Pm and the basic structure image Pb is simplified. Therefore, the process load for performing the process from a step for obtaining the image PI to a step for retrieving the fine structure image Pm and the basic structure image Pb is reduced.

As a result, in the image processing of the apparatus 10, the noise overlapping the image PI is sufficiently reduced, and the process load for reducing the noise in the image PI is reduced.

The apparatus 10 determines according to the vector concentration degree v(i, j) whether the focused picture cell (i, j) is the noise. The calculation of the vector concentration degree v(i, j) is performed under a condition that the direction of each brightness gradient vector is set to be the standard value such as "1" or "−1." Therefore, the magnitude of the vector concentration degree v(i, j) is determined by the direction of each brightness gradient vector, i.e., by index(m, n).

Accordingly, in the apparatus 10, the vector concentration degree v(i, j) is calculated based on the direction of the vector concentration degree v(i, j), not based on the magnitude of the vector concentration degree v(i, j). Thus, the apparatus 10 can stably determines whether the picture cell is the noise even when the image PI is a low contrast image.

In the apparatus 10, when the vector concentration degree v(i, j) is equal to or larger than the predetermined standard threshold α and smaller than another predetermined standard threshold β, the apparatus 10 does not process the focused picture cell (i, j). Thus, in the apparatus 10, when the focused picture cell (i, j) is the edge component or the texture component, the edge component and the texture component are maintained.

Further, in the apparatus 10, when the vector concentration degree v(i, j) is smaller than the predetermined standard threshold α, the picture cell value in the standard range is flat, and therefore, the mean filter is applied to the focused picture cell (i, j) corresponding to the vector concentration degree v(i, j).

In view of the above results, the apparatus 10 improves the image quality of the image, which is suitably used for a driver monitoring system and a periphery monitoring system. Thus, in the driver monitoring system and the periphery monitoring system, recognition accuracy is improved.

(Second Embodiment)

Next, a second embodiment will be explained as follows.

Figure 7:
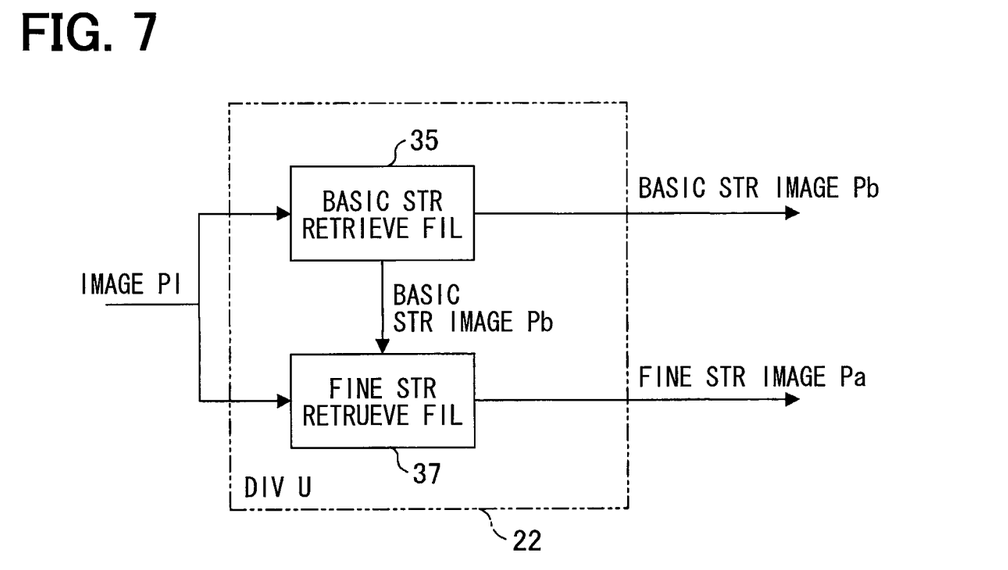
FIG. 7 is a block diagram showing a dividing unit according to a second embodiment.

In an image processing system according to a second embodiment, a dividing unit 22 is different from the image processing system 1 according to the first embodiment. Therefore, the dividing unit 22 will be explained mainly.

Here, FIG. 7 is a block diagram showing the dividing unit 22.

As shown in FIG. 7, the dividing unit 22 according to the present embodiment includes a basic structure retrieving filter 35 for retrieving the basic structure image Pb and a fine structure retrieving filter 37 for retrieving the fine structure image Pm.

The basic structure retrieving filter 35 according to the present embodiment is similar to the unit 31 according to the first embodiment.

On the other hand, the fine structure retrieving filter 37 according to the present embodiment retrieves the fine structure image Pm as a difference between the image PI obtained in the obtaining unit 21 and the basic structure image Pb.

Specifically, the fine structure retrieving filter 37 according to the present embodiment develops the difference by subtracting the spatial-frequency component (i.e., basic signal component) shown as the basic structure picture cell providing the basic structure image Pb from all of the spatial-frequency components in the image PI obtained by the obtaining unit 21. Further, the filter 37 retrieves the fine structure image Pm as the difference (i.e., the fine signal component).

Thus, in the present embodiment, the image PI in the obtaining unit 21 is input into each of the basic structure retrieving filter 35 and the fine structure retrieving filter 37. Here, the basic structure retrieving filter 35 directly retrieves the basic structure image Pb similar to the basic structure retrieving filter 31 according to the first embodiment. The fine structure retrieving filter 37 retrieves the fine structure image Pm as the difference between the image PI and the basic structure image Pb.

[Effects of Second Embodiment]

In the image processing system according to the second embodiment, the fine structure image Pm is retrieved with a simple method.

(Third Embodiment)

A third embodiment will be explained as follows.

Figure 8:
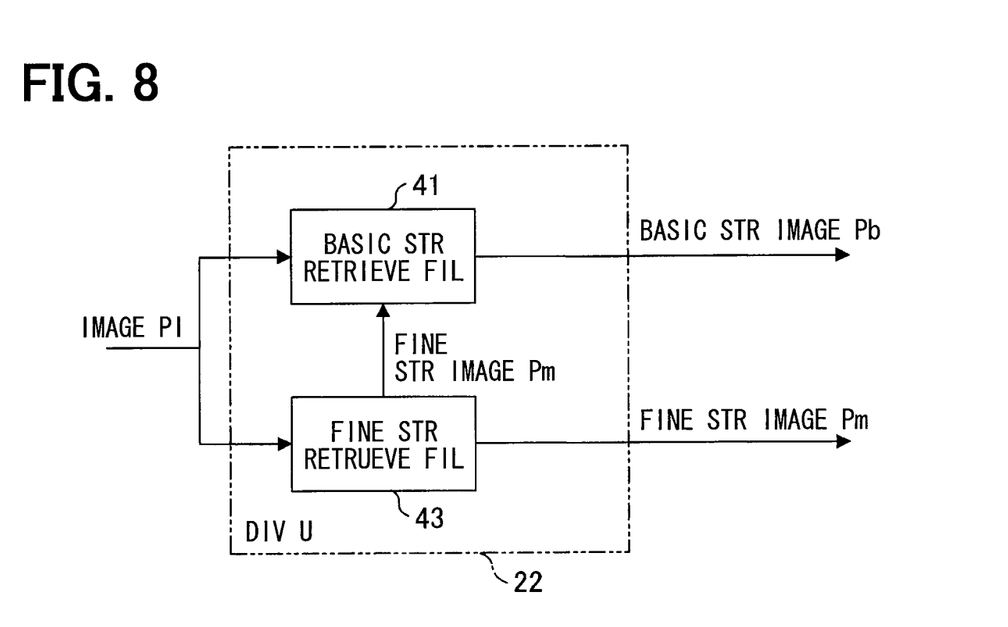
FIG. 8 is a block diagram showing a dividing unit according to a third embodiment.

In an image processing system according to a third embodiment, a dividing unit 22 is different from the image processing system 1 according to the first embodiment. Therefore, the dividing unit 22 will be explained mainly.

Here, FIG. 8 is a block diagram showing the dividing unit 22.

As shown in FIG. 8, the dividing unit 22 according to the present embodiment includes a basic structure retrieving filter 41 for retrieving the basic structure image Pb and a fine structure retrieving filter 43 for retrieving the fine structure image Pm.

The fine structure retrieving filter 43 according to the present embodiment is similar to the unit 33 according to the first embodiment.

On the other hand, the basic structure retrieving filter 41 according to the present embodiment retrieves the basic structure image Pb as a difference between the image PI obtained in the obtaining unit 21 and the fine structure image Pm.

Specifically, the basic structure retrieving filter 41 according to the present embodiment develops the difference by subtracting the spatial-frequency component (i.e., detail signal component) shown as the fine structure picture cell providing the fine structure image Pm from all of the spatial-frequency components in the image PI obtained by the obtaining unit 21. Further, the filter 41 retrieves the basic structure image Pb as the difference (i.e., the basic signal component).

Thus, in the present embodiment, the image PI in the obtaining unit 21 is input into each of the basic structure retrieving filter 41 and the fine structure retrieving filter 43. Here, the fine structure retrieving filter 43 directly retrieves the fine structure image Pm, similar to the fine structure retrieving filter 43 according to the first embodiment. The basic structure retrieving filter 41 retrieves the basic structure image Pb as the difference between the image PI and the fine structure image Pm.

[Effects of Second Embodiment]

In the image processing system according to the third embodiment the basic structure image Pb is retrieved with a simple method.

(Other Embodiments)

For example, in the above embodiments, the obtaining unit 21, the dividing unit 22, the fine image correction unit 23, and the adding unit 24 are realized by executing the noise reduction process with using the image processing apparatus 10 having the micro computer. Alternatively, the obtaining unit 21, the dividing unit 22, the fine image correction unit 23, and the adding unit 24 may be provided by a dedicated circuit for providing a certain function. In this case, the image processing apparatus 10 may include dedicated circuits for providing a function to execute the noise reduction process.

In the above embodiments, the processing method to be executed with respect to the focused picture cell (i, j) is determined according to a magnitude relationship between the vector concentration degree v(i, j) and the predetermined standard threshold $\alpha$ or another predetermined standard threshold $\beta$. Alternatively, the determination method for determining the processing method with respect to the focused picture cell (i, j) may be any. For example, the determination method may be performed with using only the predetermined standard threshold $\beta$. In this case, when the vector concentration degree v(i, j) is equal to or larger than the predetermined standard threshold $\beta$, the apparatus 10 determines that the focused picture cell (i, j) is the noise, and the focused picture cell (i, j) is filtered with the median filter. When, the vector concentration degree v(i, j) is smaller than the predetermined standard threshold $\beta$, the focused picture cell (i, j) is filtered with the mean filter.

Alternatively, the number of predetermined standard thresholds may be different from two. For example, the number of predetermined standard thresholds may be equal to or larger than three. In this case, the processing method to be executed with respect to the focused picture cell (i, j) is varied according to the magnitude relationship between the vector concentration degree v(i, j) and each predetermined standard threshold.

In the above embodiments, the determination whether the focused picture cell (i, j) is the noise is performed according to the magnitude relationship between the vector concentration degree v(i, j) and the predetermined standard threshold $\beta$. Alternatively, the determination method whether the focused picture cell (i, j) is the noise may be any. Specifically, the determination method of the noise may be any as long as the focused picture cell (i, j) is surely determined to be the noise or not.

In the above embodiments, the modified image PA is generated in such a manner that each picture cell value of the corrected detail images Pma is multiplied by the synthesis ratio R, and each modified picture cell value of the corrected detail images Pma is added to the picture cell value of the basic structure image Pb. Alternatively, the method for generating the modified image PA may be any. For example, each picture cell value of the corrected detail images Pma is added to the picture cell value of the basic structure image Pb without multiplying each picture cell value of the corrected detail images Pma by the synthesis ratio R.

Further, in the noise reduction process according to the above embodiments, when the vector concentration degree v(i, j) is equal to or larger than the predetermined standard threshold $\alpha$, it goes to step S180, and in step S180, the apparatus 10 determines whether the vector concentration degree v(i, j) is equal to or larger than another predetermined standard threshold $\beta$. Alternatively, the order of steps S160 and S180 may be switched. Specifically, when the vector concentration degree v(i, j) is smaller than another predetermined standard threshold $\beta$, the apparatus 10 may determine whether vector concentration degree v(i, j) is equal to or larger than the predetermined standard threshold $\alpha$.

In the above embodiments, the standard value is set to one. Alternatively, the standard value may be any. For example, the standard value may be two, ten, or one hundred. Alternatively, the standard value may be equal to the magnitude of the brightness vector.

The obtaining unit 21 corresponds to step S110 in the noise reduction process, and the unit 21 provides an image obtaining device. The dividing unit 22 corresponds to step S120 in the noise reduction process, and the unit 22 provides an image dividing device. The fine image correction unit 23 corresponds to steps S140 to S210 in the noise reduction process, and the unit 23 provides an image correcting device. The adding unit 24 corresponds to step S220 in the noise reduction process, and the unit 24 provides an image synthesizing device.

The above disclosure has the following aspects.

According to a first aspect of the present disclosure, an image processing apparatus includes: an image obtaining device that obtains an image by projecting an object in actual space to a plane including a plurality of picture cells; an image dividing device that filters the image through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component; an image correcting device that retrieves one of the picture cells in a fine structure image, which is provided by the detail signal component, as a focused picture cell, determines whether the focused picture cell represents the noise, corrects the detail signal component so as to reduce the noise component in the focused picture cell when the focused picture cell represents the noise so that a corrected detail signal component is generated; and an image synthesizing device that synthesizes a basic structure image which is provided by the basic signal component, and a corrected fine structure image, which is provided by the corrected detail signal component, so that a modified image is generated.

In the above apparatus, the corrected detail signal component is prepared by correcting the detail signal component in the special-frequency component of the image so as to reduce the noise component. Further, the modified image is generated by synthesizing the corrected fine structure image and the basic structure image. Accordingly, the noise overlapping the image is reduced compared with an original image. Thus, the apparatus reduces the noise.

Further, the detail signal component and the basic signal component are retrieved by using the fine structure retrieving filter and the basic structure retrieving filter, which are preliminary prepared. Thus, the throughput for performing the noise reduction process is reduced. Specifically, the throughput from a step for obtaining the image to a step for retrieving the detail signal component and the basic signal component is reduced, and therefore, the process time from the step for obtaining the image to a step for reducing the noise is also reduced.

Thus, in the apparatus, the noise overlapping the image is sufficiently reduced, and the throughput for performing the noise reduction process is reduced.

Alternatively, the image correcting device may generate a plurality of object picture cells, each of which corresponds to a picture cell in a standard range that is set around the focused picture cell as a center. The image correcting device generates a vector concentration degree, which is calculated by tallying a plurality of directions of brightness gradient vectors. Each brightness gradient vector is defined as a difference between a picture cell value of a corresponding object picture cell and a picture cell value of the focused picture cell. The image correcting device determines that the focused picture cell represents the noise when the vector concentration degree is equal to or larger than a predetermined standard threshold. The predetermined standard threshold is preliminary set as a value indicative of the noise component. In this case, the apparatus determines that the focused picture cell represents the noise when the vector concentration degree is equal to or larger than the predetermined standard threshold.

Further, the image correcting device may define that a direction of each brightness gradient vector has a positive standard value when the brightness gradient vector has a direction from a corresponding object picture cell to the focused picture cell. The image correcting device defines that a direction of each brightness gradient vector has a negative standard value when the brightness gradient vector has a direction from the focused picture cell to a corresponding object picture cell. The vector concentration degree is an absolute value of a total of the directions of brightness gradient vectors. In this case, since the vector concentration degree is calculated based on the direction of the brightness gradient vector not based on the magnitude of the vector, the apparatus can determine the noise even when the image is the low contract image.

Alternatively, the image correcting device may generate the corrected detail signal component in such a manner that the focused picture cell is filtered through a median filter with the standard range as a mask region when the focused picture cell represents the noise. In this case, the corrected detail signal component is easily retrieved by a simple filter, and the throughput for retrieving the corrected detail signal component is improved.

Alternatively, the image synthesizing device may calculate a ratio between total of picture cell values of the picture cells in the fine structure image and a total of picture cell values of the picture cells in the corrected fine structure image. The image synthesizing device multiplies the ratio by the corrected fine structure image, and the image synthesizing device generates the modified image by synthesizing the basic structure image and the corrected fine structure image multiplied by the ratio. In this case, the modified image has a low noise, and therefore, the noise overlapping the original image is surely reduced.

Alternatively, the fine structure retrieving filter may pass the detail signal component, and the basic structure retrieving filter may pass the basic signal component. The fine structure retrieving filter and the basic structure retrieving filter independently function. In this case, both of the detail signal component and the basic signal component are retrieved from the image simultaneously.

Alternatively, the basic structure retrieving filter may retrieve a difference between the detail signal component and a whole of the spatial-frequency component in the image as the basic signal component.

Further, the fine structure retrieving filter may retrieve a difference between the basic signal component and a whole of the spatial-frequency component in the image, as the detail signal component. In these cases, the basic signal component and/or the detail signal component are easily retrieved with a simple method.

According to a second aspect of the present disclosure, a method for processing an image includes: obtaining an image by projecting an object in actual space to a plane including a plurality of picture cells; filtering the image through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component; retrieving one of the picture cells in a fine structure image, which is provided by the detail signal component, as a focused picture cell, determining whether the focused picture cell represents the noise, and correcting the detail signal component so as to reduce the noise component in the focused picture cell when the focused picture cell represents the noise so that a corrected detail signal component is generated; and synthesizing a basic structure image, which is provided by the basic signal component, and a corrected fine structure image, which is provided by the corrected detail signal component, so that a modified image is generated.

In the above method, the noise overlapping the image is sufficiently reduced, and the throughput for performing the noise reduction process is reduced.

According to a third aspect of the present disclosure, a tangible computer readable medium includes instructions being executed by a computer, the instructions including a computer-implemented method for processing an image. The instructions includes: obtaining an image by projecting an object in actual space to a plane including a plurality of picture cells; filtering the image through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component; retrieving one of the picture cells in a fine structure image, which is provided by the detail signal component, as a focused picture cell, determining whether the focused picture cell represents the noise, and correcting the detail signal component so as to reduce the noise component in the focused picture cell when the focused picture cell represents the noise so that a corrected detail signal component is generated; and synthesizing a basic structure image, which is provided by the basic signal component, and a corrected fine structure image, which is provided by the corrected detail signal component, so that a modified image is generated.

In the above medium, the noise overlapping the image is sufficiently reduced, and the throughput for performing the noise reduction process is reduced.

Further, the above medium may be a DVD-ROM, a CD-ROM, a hard disk drive or the like, which are readable through a computer. Thus, the computer down-loads the instructions from the medium, and the computer executes the instructions. Alternatively, the instructions may be obtained from the medium through a communication line so that the computer executes the instructions. Thus the computer provides the image processing apparatus.

According to a fourth aspect of the present disclosure, an image processing apparatus includes: a camera that shoots an image; an image dividing device that divides the image through a fine structure retrieving filter and a basic structure retrieving filter into a fine structure image provided by a detail signal component and a basic structure image provided by a basic signal component, wherein the fine structure retrieving filter retrieves the detail signal component from the image, the detail signal component including an edge component, a texture component, and a noise component, wherein the basic structure retrieving filter retrieves the basic signal component from the image, the basic signal component being a frequency component other than the detail signal component; an image correcting device that retrieves one of picture cells in the fine structure image as a focused picture cell, determines whether the focused picture cell represents a noise, corrects the detail signal component so as to reduce the noise component in the focused picture cell when the focused picture cell represents the noise so that a corrected detail signal component is generated; and an image synthesizing device that synthesizes the basic structure image, and a corrected fine structure image, which is provided by the corrected detail signal component, so that a modified image is generated.

In the above apparatus, the noise overlapping the image is sufficiently reduced, and the throughput for performing the noise reduction process is reduced.

Alternatively, the fine structure retrieving filter may be a low pass filer for passing a frequency component having a frequency equal to or lower than an upper limit frequency. The upper limit frequency is determined so as to retrieve the detail signal component including the edge component, the texture component and the noise component. The basic structure retrieving filter may be a high pass filter for passing a frequency component having a frequency equal to or higher than a lower limit frequency. The lower limit frequency is determined so as to the frequency component other than the detail signal component.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An image processing apparatus comprising:
an image obtaining device that obtains an image by projecting an object in actual space to a plane including a plurality of picture cells;
an image dividing device that filters the image through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component;
an image correcting device that retrieves one of the picture cells in a fine structure image, which is provided by the detail signal component, as a focused picture cell, determines whether the focused picture cell represents the noise, corrects the detail signal component so as to reduce the noise component in the focused picture cell when the focused picture cell represents the noise so that a corrected detail signal component is generated; and
an image synthesizing device that synthesizes a basic structure image, which is provided by the basic signal component, and a corrected fine structure image, which is provided by the corrected detail signal component, so that a modified image is generated, wherein
the image correcting device generates a plurality of object picture cells, each of which corresponds to a picture cell in a standard range that is set around the focused picture cell as a center,
the image correcting device generates a vector concentration degree, which is calculated by tallying a plurality of directions of brightness gradient vectors,
each brightness gradient vector is defined as a difference between a picture cell value of a corresponding object picture cell and a picture cell value of the focused picture cell,
the image correcting device determines that the focused picture cell represents the noise when the vector concentration degree is equal to or larger than a predetermined standard threshold, and
the predetermined standard threshold is preliminary set as a value indicative of the noise component.

2. The image processing apparatus according to claim 1, wherein the image correcting device defines that a direction of each brightness gradient vector has a positive standard value when the brightness gradient vector has a direction from a corresponding object picture cell to the focused picture cell, wherein the image correcting device defines that a direction of each brightness gradient vector has a negative standard value when the brightness gradient vector has a direction from the focused picture cell to a corresponding object picture cell, and wherein the vector concentration degree is an absolute value of a total of the directions of brightness gradient vectors.

3. The image processing apparatus according to claim 1, wherein the image correcting device generates the corrected detail signal component in such a manner that the focused picture cell is filtered through a median filter with the standard range as a mask region when the focused picture cell represents the noise.

4. An image processing apparatus comprising:
an image obtaining device that obtains an image by projecting an object in actual space to a plane including a plurality of picture cells;
an image dividing device that filters the image through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component;
an image correcting device that retrieves one of the picture cells in a fine structure image, which is provided by the detail signal component, as a focused picture cell, determines whether the focused picture cell represents the noise, corrects the detail signal component so as to reduce the noise component in the focused picture cell when the focused picture cell represents the noise so that a corrected detail signal component is generated; and
an image synthesizing device that synthesizes a basic structure image, which is provided by the basic signal component, and a corrected fine structure image, which is provided by the corrected detail signal component, so that a modified image is generated, wherein
the image synthesizing device calculates a ratio between total of picture cell values of the picture cells in the fine structure image and a total of picture cell values of the picture cells in the corrected fine structure image, wherein the image synthesizing device multiplies the ratio by the corrected fine structure image, and
the image synthesizing device generates the modified image by synthesizing the basic structure image and the corrected fine structure image multiplied by the ratio.

5. The image processing apparatus according to claim 1, wherein the fine structure retrieving filter passes the detail signal component,
wherein the basic structure retrieving filter passes the basic signal component, and
wherein the fine structure retrieving filter and the basic structure retrieving filter independently function.

6. The image processing apparatus according to claim 1, wherein the basic structure retrieving filter retrieves a difference between the detail signal component and a whole of the spatial-frequency component in the image, as the basic signal component.

7. The image processing apparatus according to claim 1, wherein the fine structure retrieving filter retrieves a difference between the basic signal component and a whole of the spatial-frequency component in the image, as the detail signal component.

8. A method for processing an image comprising:
obtaining with a computer an image by projecting an object in actual space to a plane including a plurality of picture cells;
filtering the image with the computer through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component;
retrieving with the computer one of the picture cells in a fine structure image, which is provided by the detail signal component, as a focused picture cell, determining with the computer whether the focused picture cell represents the noise, and correcting with the computer the detail signal component so as to reduce the noise component in the focused picture cell when the focused picture cell represents the noise so that a corrected detail signal component is generated; and
synthesizing with the computer a basic structure image, which is provided by the basic signal component, and a corrected fine structure image, which is provided by the corrected detail signal component, so that a modified image is generated, wherein
the retrieving of the one of the picture cells includes:
generating with the computer a plurality of object picture cells, each of which corresponds to a picture cell in a standard range that is set around the focused picture cell as a center; and
generating with the computer a vector concentration degree, which is calculated by tallying a plurality of directions of brightness gradient vectors, wherein
each brightness gradient vector is defined as a difference between a picture cell value of a corresponding object picture cell and a picture cell value of the focused picture cell,
the focused picture cell represents the noise when the vector concentration degree is equal to or larger than a predetermined standard threshold, and
the predetermined standard threshold is preliminary set as a value indicative of the noise component.

9. The method for processing the image according to claim 8, wherein
a direction of each brightness gradient vector has a positive standard value when the brightness gradient vector has a direction from a corresponding object picture cell to the focused picture cell,
a direction of each brightness gradient vector has a negative standard value when the brightness gradient vector has a direction from the focused picture cell to a corresponding object picture cell, and
the vector concentration degree is an absolute value of a total of the directions of brightness gradient vectors.

10. The method for processing the image according to claim 8,
wherein the correcting with the computer the detail signal component includes: filtering with the computer the focused picture cell through a median filter with the standard range as a mask region when the focused picture cell represents the noise.

11. A method for processing an image comprising:
obtaining with a computer an image by projecting an object in actual space to a plane including a plurality of picture cells;
filtering the image with the computer through a fine structure retrieving filter and a basic structure retrieving filter so as to retrieve a detail signal component of the image and a basic signal component of the image, respectively, wherein the fine structure retrieving filter retrieves the detail signal component from a spatial-frequency component in the image, the detail signal component including an edge component indicative of an edge of the object, a texture component indicative of a texture of the object, and a noise component indicative of a noise overlapping the image, wherein the basic structure retrieving filter retrieves the basic signal component from the spatial-frequency component in the image, the basic signal component being the spatial-frequency component other than the detail signal component;
retrieving with the computer, one of the picture cells in a fine structure image, which is provided by the detail signal component, as a focused picture cell, determining with the computer whether the focused picture cell represents the noise, and correcting with the computer the detail signal component so as to reduce the noise component in the focused picture cell when the focused picture cell represents the noise so that a corrected detail signal component is generated; and
synthesizing with the computer a basic structure image, which is provided by the basic signal component, and a corrected fine structure image, which is provided by the corrected detail signal component, so that a modified image is generated
wherein the synthesizing with a computer the basic structure image and the corrected fine structure image includes:
calculating with the computer a ratio between total of picture cell values of the picture cells in the fine structure image and a total of picture cell values of the picture cells in the corrected fine structure image;
multiplying with the computer the ratio by the corrected fine structure image; and
generating with the computer the modified image by synthesizing the basic structure image and the corrected fine structure image multiplied by the ratio.

12. The method for processing the image according to claim 8,
wherein the fine structure retrieving filter passes the detail signal component,
wherein the basic structure retrieving filter passes the basic signal component, and
wherein the fine structure retrieving filter and the basic structure retrieving filter independently function.

13. The method for processing the image according to claim 8,
wherein the basic structure retrieving filter retrieves a difference between the detail signal component and a whole of the spatial-frequency component in the image, as the basic signal component.

14. The method for processing the image according to claim 8,
wherein the fine structure retrieving filter retrieves a difference between the basic signal component and a whole of the spatial-frequency component in the image, as the detail signal component.

15. An image processing apparatus comprising:
a camera that shoots an image;
an image dividing device that divides the image through a fine structure retrieving filter and a basic structure retrieving filter into a fine structure image provided by a detail signal component and a basic structure image provided by a basic signal component, wherein the fine structure retrieving filter retrieves the detail signal component from the image, the detail signal component including an edge component, a texture component, and a noise component, wherein the basic structure retrieving filter retrieves the basic signal component from the image, the basic signal component being a frequency component other than the detail signal component;
an image correcting device that retrieves one of picture cells in the fine structure image as a focused picture cell, determines whether the focused picture cell represents a noise, corrects the detail signal component so as to reduce the noise component in the focused picture cell when the focused picture cell represents the noise so that a corrected detail signal component is generated; and
an image synthesizing device that synthesizes the basic structure image, and a corrected fine structure image, which is provided by the corrected detail signal component, so that a modified image is generated, wherein
the fine structure retrieving filter is a low pass filer for passing a frequency component having a frequency equal to or lower than an upper limit frequency,
the upper limit frequency is determined so as to retrieve the detail signal component including the edge component, the texture component and the noise component,
the basic structure retrieving filter is a high pass filter for passing a frequency component having a frequency equal to or higher than a lower limit frequency, and
the lower limit frequency is determined so as to the frequency component other than the detail signal component.

16. An image processing apparatus comprising:
a camera that shoots an image;
an image dividing device that divides the image through a fine structure retrieving filter and a basic structure retrieving filter into a fine structure image provided by a detail signal component and a basic structure image provided by a basic signal component, wherein the fine structure retrieving filter retrieves the detail signal component from the image, the detail signal component including an edge component, a texture component, and a noise component, wherein the basic structure retrieving filter retrieves the basic signal component from the image, the basic signal component being a frequency component other than the detail signal component;
an image correcting device that retrieves one of picture cells in the fine structure image as a focused picture cell, determines whether the focused picture cell represents a noise, corrects the detail signal component so as to reduce the noise component in the focused picture cell when the focused picture cell represents the noise so that a corrected detail signal component is generated; and
an image synthesizing device that synthesizes the basic structure image, and a corrected fine structure image, which is provided by the corrected detail signal component, so that a modified image is generated, wherein
the image correcting device generates a plurality of object picture cells, each of which corresponds to a picture cell in a standard range that is set around the focused picture cell as a center, the image correcting device generates a vector concentration degree, which is calculated by tallying a plurality of directions of brightness gradient vectors, each brightness gradient vector is defined as a difference between a picture cell value of a corresponding object picture cell and a picture cell value of the focused picture cell, the image correcting device determines that the focused picture cell represents the noise when the vector concentration degree is equal to or larger than a predetermined standard threshold, and the predetermined standard threshold is preliminary set as a value indicative of the noise component.

17. The image processing apparatus according to claim 16, wherein the image correcting device defines that a direction of each brightness gradient vector has a positive standard value when the brightness gradient vector has a direction from a corresponding object picture cell to the focused picture cell, the image correcting device defines that a direction of each brightness gradient vector has a negative standard value when the brightness gradient vector has a direction from the focused picture cell to a corresponding object picture cell, and the vector concentration degree is an absolute value of a total of the directions of brightness gradient vectors.

18. The image processing apparatus according to claim 16, wherein the image correcting device generates the corrected detail signal component in such a manner that the focused picture cell is filtered through a median filter with the standard range as a mask region when the focused picture cell represents the noise.

19. An image processing apparatus comprising:

a camera that shoots an image;

an image dividing device that divides the image through a fine structure retrieving filter and a basic structure retrieving filter into a fine structure image provided by a detail signal component and a basic structure image provided by a basic signal component, wherein the fine structure retrieving filter retrieves the detail signal component from the image, the detail signal component including an edge component, a texture component, and a noise component, wherein the basic structure retrieving filter retrieves the basic signal component from the image, the basic signal component being a frequency component other than the detail signal component;

an image correcting device that retrieves one of picture cells in the fine structure image as a focused picture cell, determines whether the focused picture cell represents a noise, corrects the detail signal component so as to reduce the noise component in the focused picture cell when the focused picture cell represents the noise so that a corrected detail signal component is generated; and an image synthesizing device that synthesizes the basic structure image, and a corrected fine structure image, which is provided by the corrected detail signal component, so that a modified image is generated, wherein the image synthesizing device calculates a ratio between a total of picture cell values of the picture cells in the fine structure image and a total of picture cell values of the picture cells in the corrected fine structure image, the image synthesizing device multiplies the ratio by the corrected fine structure image, and the image synthesizing device generates the modified image by synthesizing the basic structure image and the corrected fine structure image multiplied by the ratio.

* * * * *